United States Patent
Ueno

(10) Patent No.: US 8,564,983 B2
(45) Date of Patent: Oct. 22, 2013

(54) POWER SUPPLY DEVICE AND IMAGE FORMING APPARATUS

(75) Inventor: Tsuyoshi Ueno, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 322 days.

(21) Appl. No.: 13/043,706

(22) Filed: Mar. 9, 2011

(65) Prior Publication Data

US 2011/0222313 A1   Sep. 15, 2011

(30) Foreign Application Priority Data

Mar. 11, 2010   (JP) .................................. 2010-055005

(51) Int. Cl.
*H02M 1/36* (2007.01)

(52) U.S. Cl.
USPC ............................................................ 363/49

(58) Field of Classification Search
USPC ........................................... 363/49; 323/901
See application file for complete search history.

(56) References Cited

U.S. PATENT DOCUMENTS 7,545,657 B2 * 6/2009 Shimada et al. ................ 363/49
2010/0320993 A1   12/2010 Yoshii

FOREIGN PATENT DOCUMENTS

| JP | 10-323031 | 12/1998 |
| JP | 2000-060118 A | 2/2000 |
| JP | 2009-146172 | 7/2009 |

\* cited by examiner

*Primary Examiner* — Harry Behm
(74) *Attorney, Agent, or Firm* — IPUSA, PLLC

(57) ABSTRACT

A power supply device includes a transformer including a primary coil, a secondary coil, and a tertiary coil; a switching element connected via the primary coil to a direct-current power supply; a first rectifying-and-smoothing circuit rectifying and smoothing a voltage generated in the secondary coil; a control circuit turning on and off the switching element; a second rectifying-and-smoothing circuit rectifying and smoothing a voltage generated in the third coil to generate a driving voltage for the control circuit; and a starting circuit including a first transistor, a first resistor, and a first capacitor connected in series between the direct-current power supply and a ground, a second transistor connected between the direct-current power supply and the second rectifying-and-smoothing circuit, and a turn-off unit turning off at least the second transistor out of the first transistor and the second transistor when the first capacitor is charged to a predetermined voltage.

12 Claims, 16 Drawing Sheets

POWER SUPPLY DEVICE AND IMAGE FORMING APPARATUS

CROSS-REFERENCE TO RELATED APPLICATION

The present application is based upon and claims the benefit of priority of Japanese Patent Application No. 2010-055005, filed on Mar. 11, 2010, the entire contents of which are incorporated herein by reference.

BACKGROUND OF THE INVENTION

1. Field of the Invention

A certain aspect of this disclosure relates to a power supply device and an image forming apparatus including the power supply device.

2. Description of the Related Art

In many electronic devices, appropriate driving power is generated from power supplied from an alternating-current (AC) power supply such as a commercial power supply or a direct-current (DC) power supply such as a battery, and the generated driving power is supplied to circuits on a circuit board. Accordingly, many electronic devices include a power supply device for generating the driving power.

FIGS. 1 and 2 illustrate exemplary configurations including a switching power supply device and an AC power supply. In FIG. 1, a diode bridge 14 and a smoothing capacitor 15 constitute a rectifying-and-smoothing circuit and the rectifying-and-smoothing circuit is connected to a switching power supply device 100. The diode bridge 14 full-wave-rectifies an alternating voltage input from an AC power supply 11. The smoothing capacitor 15 further smoothes the rectified voltage output from the diode bride 14. The smoothed voltage is input to the switching power supply device 100.

In FIG. 2, a power factor correction (PFC) circuit 16 is connected via the smoothing capacitor 15 to the switching power supply device 100. The smoothing capacitor 15 shapes a rectified voltage output from the power factor correction circuit 16 and inputs the shaped voltage to the switching power supply device 100. In either one of the configurations illustrated in FIGS. 1 and 2, a direct voltage is input to a terminal DCin of the switching power supply device 100.

FIG. 3 is a circuit diagram illustrating an exemplary configuration of the switching power supply device 100 according to the related art. The switching power supply device 100 of FIG. 3 includes a transformer T100, a power MOSFET Qsw that is a switching element connected to a primary coil Lp of the transformer T100, a control circuit 101, a voltage detection circuit 201, a diode Dsub, a diode Ds, a starting resistor Rstart, a capacitor Csub (power supply capacitor), and a capacitor Cs.

Power is supplied from a direct-current power supply to a terminal DCin connected to one end of the primary coil Lp and to one end of the starting resistor Rstart. The other end of the starting resistor Rstart is connected to a terminal VCC of the control circuit 101, the capacitor Csub, and one end of the diode Dsub. The control circuit 101 includes a Zener diode ZD1 the forward direction of which is toward the terminal VCC.

When the switching power supply device 100 is started, the direct voltage applied to the terminal DCin causes a starting current Istart of several mA to several tens mA to flow via the starting resistor Rstart into the terminal VCC and the capacitor Csub. The capacitor Csub is charged by the starting current Istart and the control circuit 101 is driven by the power stored in the capacitor Csub. Then, the control circuit 101 starts switching control of the power MOSFET Qsw.

When the power MOSFET Qsw is turned on and off, a current flows through the primary coil Lp of the transformer T100. This current change causes electromagnetic induction and generates an electromotive force in a secondary coil Ls of the transformer T100 and the electromotive force generates a current in the secondary coil Ls. The current generated in the secondary coil Ls is rectified and smoothed by the diode Ds and the capacitor Cs. The rectified and smoothed voltage is output from a terminal DCout of the switching power supply device 100. The diode Ds and the capacitor Cs constitute a first rectifying-and-smoothing circuit 301.

Similarly, when the starting current Istart flows through the primary coil Lp, the current change causes electromagnetic induction and generates an electromotive force in a tertiary coil Lsub, and the electromotive force generates a current. The current generated by the electromotive force is rectified by the diode Dsub connected to the tertiary coil Lsub, charges the capacitor Csub, and is supplied to the terminal VCC to drive the control circuit 101. The diode Dsub and the capacitor Csub constitute a second rectifying-and-smoothing circuit 302.

The voltage detection circuit 201 detects an output voltage to be output from the terminal DCout and generates a feedback signal to be sent to the control circuit 101. The voltage generated by the first rectifying-and-smoothing circuit 301 is divided by resistors RFB1 and RFB2 and a division of the voltage is input to a shunt regulator ZDshunt. The shunt regulator ZDshunt regulates a current flowing through a photodiode PD of a photocoupler PC such that the division of the voltage always equals an internal reference voltage. A resistor RFB5 and a resistor RFB6 regulate the current flowing into the photodiode PD. A capacitor CFB1 and a resistor RFB3 adjust frequency characteristics of the feedback by the photodiode PD.

With the above configuration, when the voltage generated by the first rectifying-and-smoothing circuit 301 exceeds a desired level, a current flows through the photodiode PD of the photocoupler PC. As a result, the photodiode PD emits light and is coupled to a phototransistor PT of the photocoupler PC.

A current flowing through the phototransistor PT generates a voltage, which is determined by the resistance of a resistor RFB4 and the current value, to be applied to a terminal FB of the control circuit 101.

The control circuit 101 turns on and off the power MOSFET Qsw according to the voltage level, at the terminal FB. This configuration makes it possible to control the switching frequency and the time ratio (or duty ratio) of the power MOSFET Qsw according to the output voltage level at the terminal DCout detected by the voltage detection circuit 201 and thereby makes it possible to obtain a desired output voltage.

FIG. 4 is a circuit diagram illustrating another exemplary configuration of the switching power supply device 100 according to the related art. In FIG. 4, a resistor Rocp is connected to one end of the power MOSFET Qsw. Also, one end of the resistor Rocp and the phototransistor PT are connected together to the terminal FB of the control circuit 101. This configuration makes it possible to use the voltage of the current flowing through the phototransistor PT and the voltage of the current flowing through the primary coil Lp for feedback control.

However, the configurations of FIGS. 3 and 4 tend to increase the power consumption. When the switching power supply device 100 is started, the starting current Istart for generating a driving voltage for the control circuit 101 flows via the starting resistor Rstart to the terminal VCC of the control circuit 101 and the capacitor Csub. Also, after the switching control of the power MOSFET Qsw is started, the control circuit 101 is driven by the voltage of the capacitor Csub that is charged by the current flowing from the tertiary coil Lsub via the diode Dsub into the capacitor Csub.

Here, the Zener diode ZD1 is provided at the terminal VCC of the control circuit 101 to prevent damage due to an overvoltage. The Zener diode ZD1 keeps the voltage at the terminal VCC, for example, within a range from several to ten and several volts. Meanwhile, a direct voltage of one hundred and several tens volts to about 400 volts, which is obtained by smoothing an alternating voltage by a diode bridge and a capacitor or by a power factor correction circuit, is applied to the terminal DCin.

Therefore, even after the switching control is started by the control circuit 101 and the capacitor Csub is charged via the tertiary coil Lsub and the diode Dsub, a voltage of one hundred and several tens volts to about 400 volts continues to be applied to the ends of the starting resistor Rstart and the starting resistor Rstart continues to consume power.

Although the load of the switching power supply device 100 is reduced to several watts when it is in a standby state, power loss by the starting resistor Rstart is still large since the power loss is proportional to the square of the voltage across the starting resistor Rstart.

Meanwhile, if the resistance of the starting resistor Rstart is increased to reduce the power loss, the current flowing to the capacitor Csub decreases. This in turn increases the time for charging the capacitor Csub and thereby increases the start-up time of the switching power supply device 100.

To prevent the above problem, a configuration for reducing the power consumption by a starting resistor has been proposed (see, for example, Japanese Laid-Open Patent Publication No. 10-323031). JP10-323031 discloses a power supply device where a starting resistor R1, a switching element Q2, and a capacitor C2 are connected in series to a direct-current power supply in the order mentioned, and the switching element Q2 is driven by resistors R3 and R4 and diodes D2, D3, and D4. In the disclosed configuration, after the power supply device is started, the switching element Q2 is turned off to disconnect the starting resistor R1 from the power supply and thereby to reduce the power consumption.

SUMMARY OF THE INVENTION

In an aspect of this disclosure, there is provided a power supply device that includes a transformer including a primary coil, a secondary coil, and a tertiary coil; a switching element connected via the primary coil to a direct-current power supply; a first rectifying-and-smoothing circuit rectifying and smoothing a voltage generated in the secondary coil and supplying the rectified and smoothed voltage to a load; a control circuit turning on and off the switching element; a second rectifying-and-smoothing circuit rectifying and smoothing a voltage generated in the third coil and thereby generating a driving voltage for driving the control circuit; and a starting circuit. The starting circuit includes a first transistor, a first resistor, and a first capacitor connected in series between the direct-current power supply and a ground; a second transistor connected between the direct-current power supply and the second rectifying-and-smoothing circuit; and a turn-off unit turning off at least the second transistor out of the first transistor and the second transistor when the first capacitor is charged to a predetermined voltage.

DESCRIPTION OF THE PREFERRED EMBODIMENTS

With the power supply device disclosed in JP10-323031, it may be possible to reduce the power consumption by the starting resistor R1. However, since the direct-current power supply is connected in series via the resistors R3 and R4 to the ground (GND), power loss is still caused by the resistors R3 and R4.

Embodiments of the present invention are described below with reference to the accompanying drawings.

A switching power supply device according to an embodiment of the present invention can supply power to various electronic apparatuses such as an image forming apparatus. An electrophotographic image forming apparatus is generally configured to consume a relatively large amount of power during start-up to reduce the time necessary to become ready for printing, but to consume little power in a standby state. A switching power supply device according to an embodiment of the present invention makes it possible to reduce the power consumption related to the starting current Istart to substantially zero both during an image forming process and in a standby state.

Figure 5:
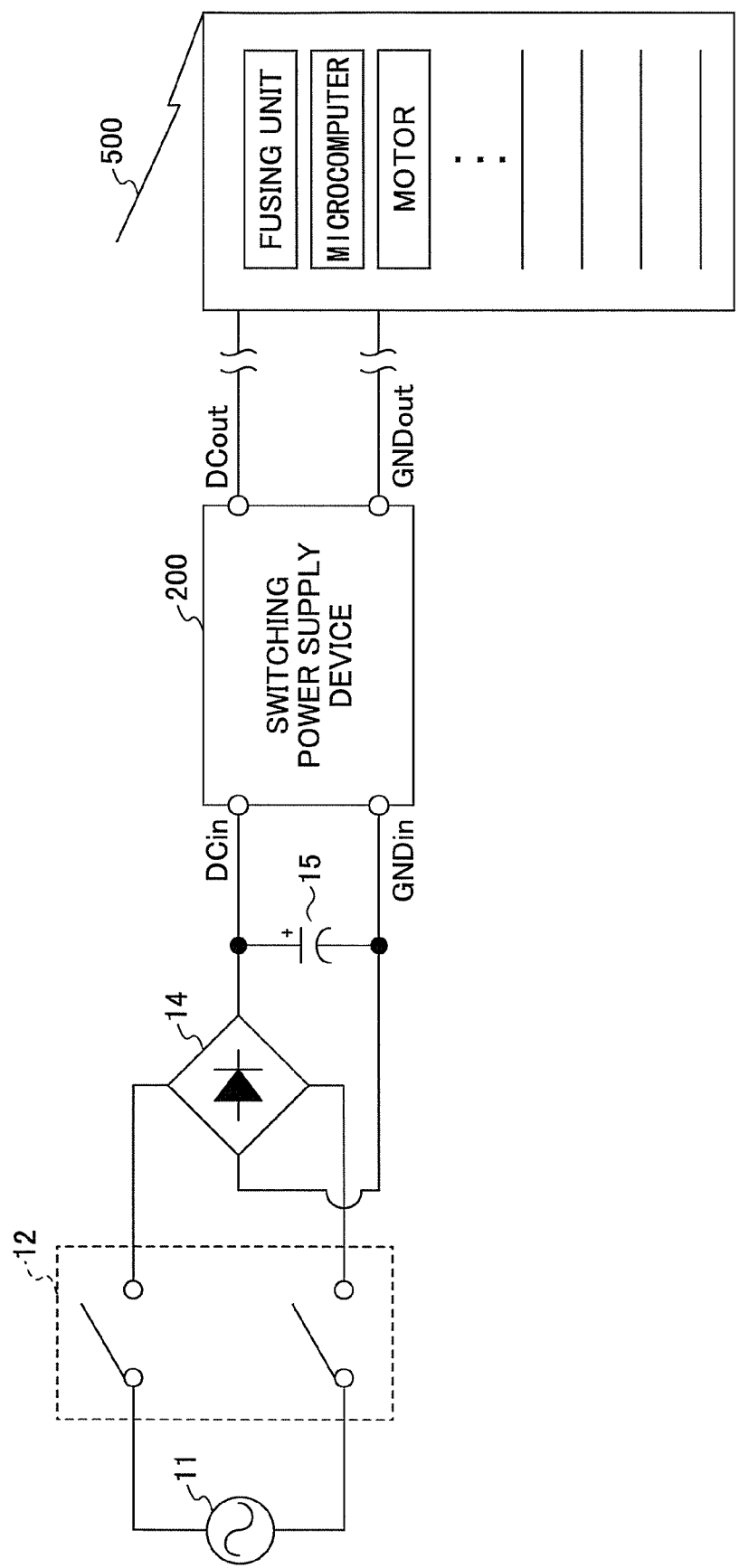
FIG. 5 is a drawing illustrating an exemplary configuration including a switching power supply device and an electronic apparatus.

FIG. 5 is a drawing illustrating an exemplary configuration including a switching power supply device and an electronic apparatus. In FIG. 5, an alternating-current (AC) power supply 11 is connected via a main power switch 12 to a diode bridge 14. The diode bridge 14 is connected to a smoothing capacitor 15 and a switching power supply device 200. When the main power switch 12 is turned on, a direct voltage is supplied to the switching power supply device 200. The AC power supply 11 is typically a commercial power supply. However, the AC power supply 11 may be implemented by a power generation system where a direct voltage generated by a natural energy generator is converted into an alternating voltage by a power conditioner.

The diode bridge 14 is an example of a rectifying circuit and full-wave-rectifies an alternating voltage input from the AC power supply 11. The smoothing capacitor 15 smoothes the rectified voltage to obtain a direct voltage. The direct voltage is input to a terminal DCin of the switching power supply device 200. The direct voltage is, for example, from one hundred and several tens volts to about 400 volts. Although the diode bridge 14 and the smoothing capacitor 15 are used to smooth the alternating voltage in FIG. 5, a power factor correction circuit may instead be used to obtain a direct voltage.

The switching power supply device 200 generates a direct voltage of a desired level with a first rectifying-and-smoothing circuit described later, and supplies the direct voltage to an electronic apparatus. In FIG. 5, an image forming apparatus 500 is used as an example of the electronic apparatus. The switching power supply device 200 may be integrated in the image forming apparatus 500. The image forming apparatus 500 includes various loads such as a fusing unit, a microcomputer, a motor, and a secondary battery that are driven by a direct-current power supply. The switching power supply device 200 supplies power to one or more of the loads.

<First Embodiment>

Figure 1:
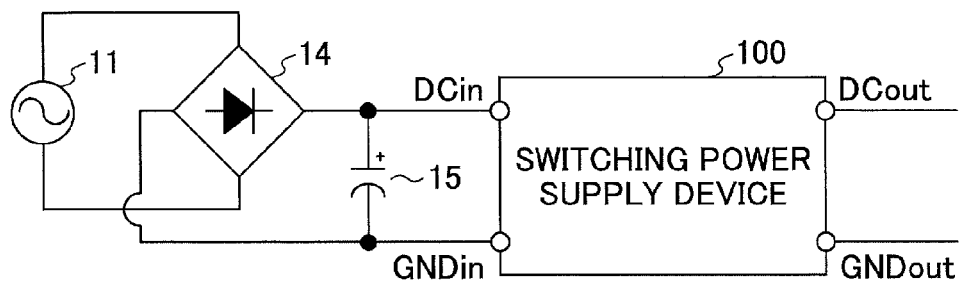
FIG. 1 is a drawing illustrating an exemplary configuration including a switching power supply device and an AC power supply.
Figure 2:
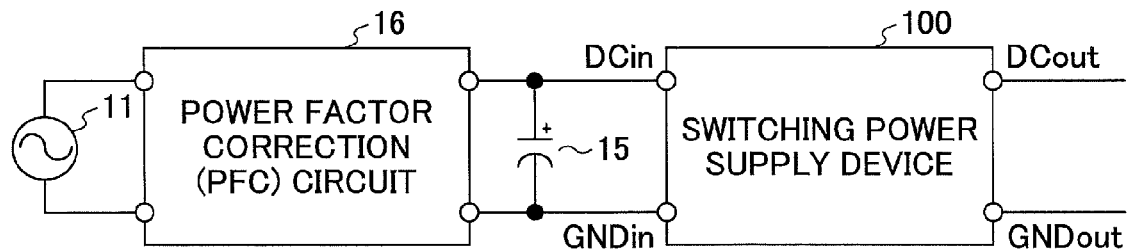
FIG. 2 is a drawing illustrating another exemplary configuration including a switching power supply device and an AC power supply.
Figure 3:
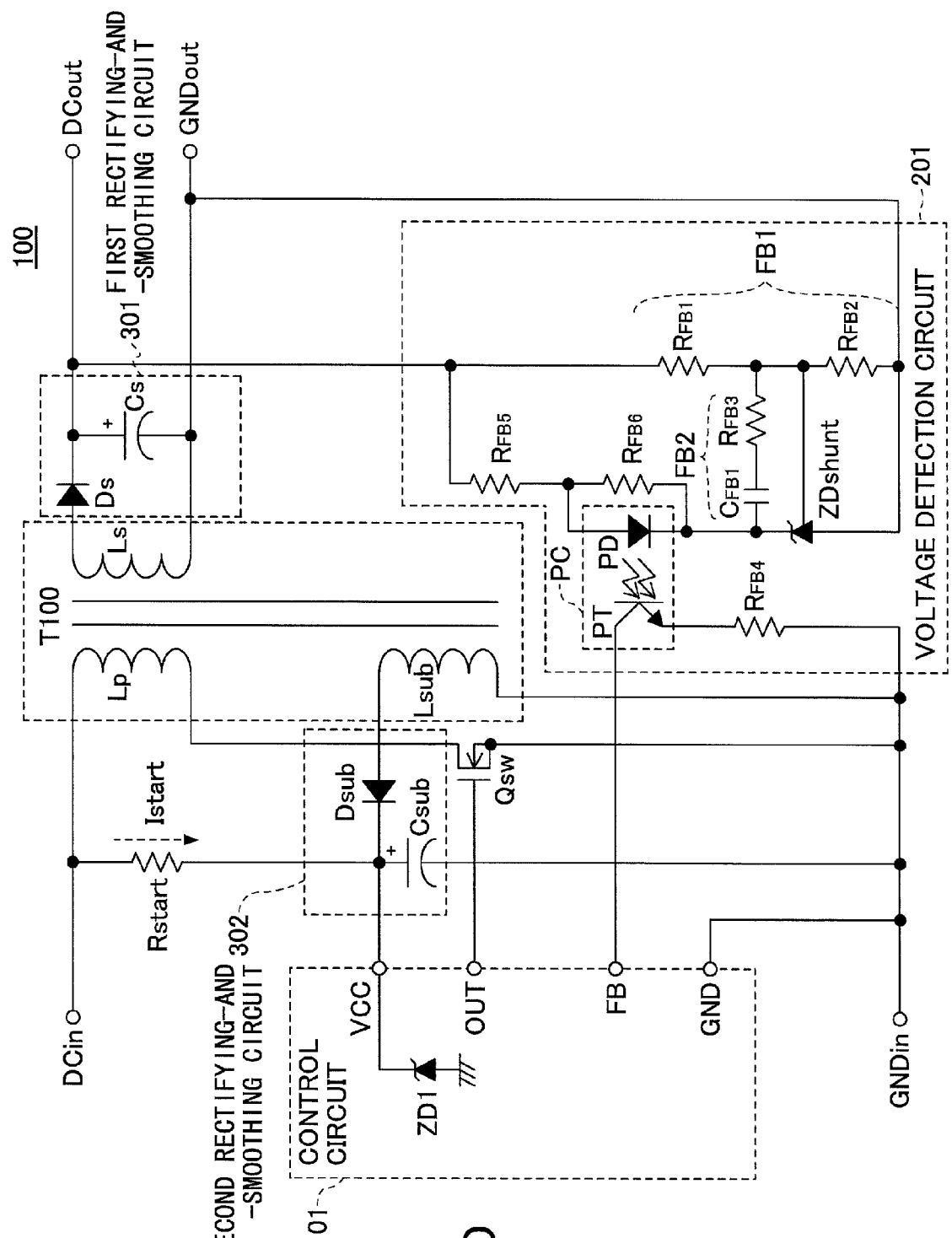
FIG. 3 is a circuit diagram illustrating an exemplary configuration of a related-art switching power supply device.
Figure 4:
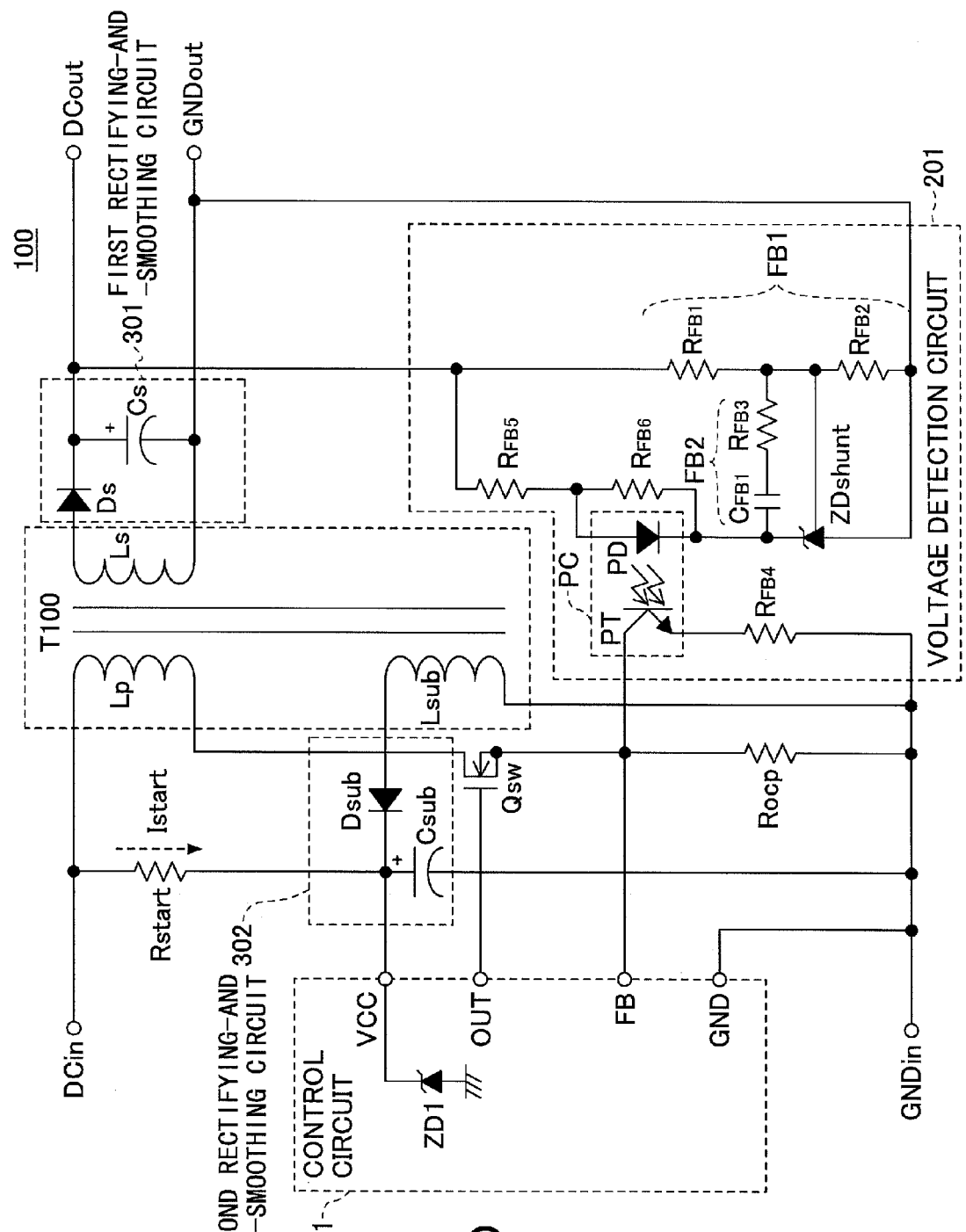
FIG. 4 is a circuit diagram illustrating another exemplary configuration of a related-art switching power supply device.
Figure 6:
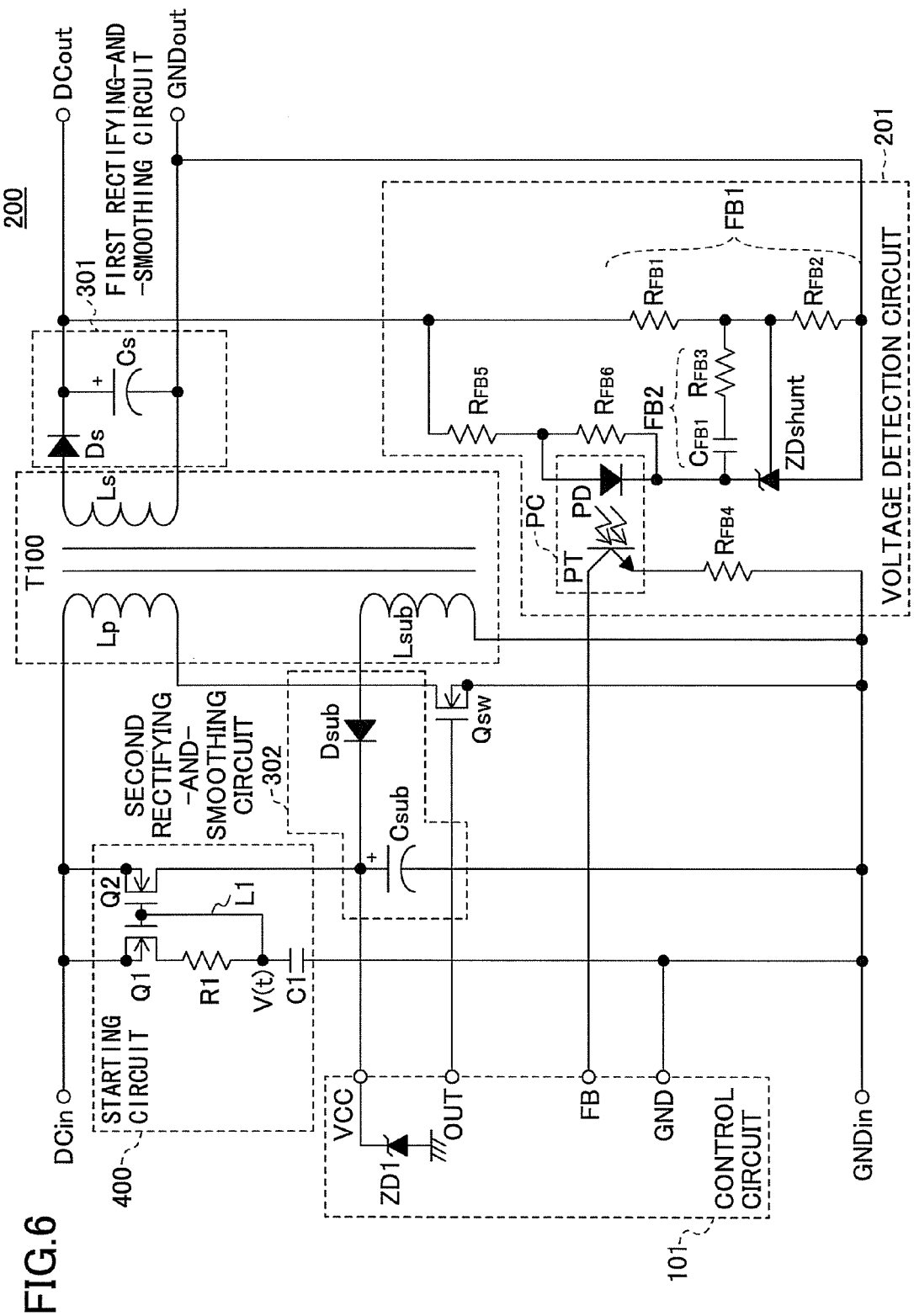
FIG. 6 is a circuit diagram illustrating an exemplary configuration of a switching power supply device according to a first embodiment of the present invention.

FIG. 6 is a circuit diagram illustrating an exemplary configuration of the switching power supply device 200 according to a first embodiment of the present invention. The switching power supply device 200 of FIG. 6 is different from the related-art switching power supply device 100 of FIGS. 3 and 4 in that the switching power supply device 200 includes a starting circuit 400 connected in series to the terminal DCin. The switching power supply device 200 also includes a transformer T100, a power MOSFET Qsw that is a switching element connected to a primary coil Lp of the transformer T100, a control circuit 101, a voltage detection circuit 201, a diode Dsub, a diode Ds, a capacitor Csub, and a capacitor Cs.

The starting circuit 400 and the primary coil Lp are connected in parallel and each of them is connected in series to the terminal DCin to which power is supplied from a direct-current power supply. One end of the primary coil Lp is connected to the source of the power MOSFET Qsw. The gate of the power MOSFET Qsw is connected to a terminal OUT of the control circuit 101. The control circuit 101 includes a Zener diode ZD1 the forward direction of which is toward a terminal VCC.

One end of a tertiary coil Lsub of the transformer T100 is connected to the diode Dsub the forward direction of which is toward the terminal VCC of the control circuit 101. The diode Dsub and the starting circuit 400 are connected together to the terminal VCC of the control circuit 101 and to the capacitor Csub.

When the control circuit 101 turns on and off a voltage applied to the gate of the power MOSFET Qsw at high speed, current change is caused in the primary coil Lp of the transformer T100. The current change in turn causes electromagnetic induction and generates an electromotive force in a secondary coil Ls of the transformer T100. The generated electromotive force corresponds to the turns ratio between the primary coil Lp and the secondary coil Ls. A current generated by the electromotive force in the secondary coil Ls is rectified by the diode Ds and charges the capacitor Cs. A voltage generated by charging the capacitor Cs is output from a terminal DCout. The diode Ds and the capacitor Cs constitute a first rectifying-and-smoothing circuit 301.

Similarly, when the control circuit 101 turns on and off the voltage applied to the gate of the power MOSFET Qsw at high speed, the current change caused in the primary coil Lp of the transformer T100 causes electromagnetic induction and generates an electromotive force in the tertiary coil Lsub of the transformer T100. The generated electromotive force corresponds to the turns ratio between the primary coil Lp and the tertiary coil Lsub. The current generated by the electromotive force is rectified by the diode Dsub connected to the tertiary coil Lsub, charges the capacitor Csub, and is supplied to the terminal VCC to drive the control circuit 101. The diode Dsub and the capacitor Csub constitute a second rectifying-and-smoothing circuit 302.

The voltage detection circuit 201 is connected between the capacitor Cs and the terminal DCout. The voltage detection circuit 201 detects an output voltage to be output from the terminal DCout and generates a feedback signal to be sent to the control circuit 101. The voltage detection circuit 201 includes resistors RFB1 and RFB2 for dividing the voltage of the terminal DCout, a shunt regulator ZDshunt to which a division of the voltage is input, a photodiode PD of a photocoupler PC connected in series to the shunt regulator ZDshunt in an opposing direction, a resistor RFB5 and a resistor RFG6 connected in series to the shunt regulator ZDshunt, and a capacitor CFB1 and a resistor RFB3 connected in parallel with the photodiode PD.

The shunt regulator ZDshunt regulates a current flowing through the photodiode PD of the photocoupler PC such that the division of the voltage always equals an internal reference voltage. The resistor RFB5 and the resistor RFB6 regulate a current generated by the output voltage and flowing into the photodiode PD. The capacitor CFB1 and the resistor RFB3 adjust frequency characteristics of the feedback by the photodiode PD.

When the output voltage applied to the terminal DCout exceeds a predetermined level, the current flowing into the shunt regulator ZDshunt increases and a current flows through the photodiode PD of the photocoupler PC. When the output voltage applied to the terminal DCout becomes less than or equal to the predetermined level, the current flowing into the shunt regulator ZDshunt decreases and the current stops flowing through the photodiode PD of the photocoupler PC. When a current flows through the photodiode PD of the photocoupler PC, the photodiode PD emits light and is coupled to a phototransistor PT of the photocoupler PC.

A voltage, which is determined by the current flowing through the phototransistor PT, the resistance of a resistor RFB4, and a current flowing through the resistor RFB4, is applied to a terminal FB of the control circuit 101. The control circuit 101 monitors the voltage applied to the terminal FB and controls the on/off signal (duty ratio) to be output from the terminal OUT to the power MOSFET Qsw.

Next, the starting circuit 400 is described below. The starting circuit 400 is connected in series to the terminal DCin and includes a first transistor Q1 and a second transistor Q2 that are connected in parallel. Both of the gates of the first transistor Q1 and the second transistor Q2 are connected to a capacitor C1. The source of the first transistor Q1 is connected to the terminal DCin to which power is supplied from the direct-current power supply. The drain of the first transistor Q1 is connected via a resistor R1 and the capacitor C1 to a terminal GNDin that functions as the ground. The first transistor Q1, the resistor R1, and the capacitor C1 are connected in series.

The first transistor Q1, the resistor R1, and the capacitor C1 constitute a control voltage generating circuit. In FIG. 6, V(t) indicates the voltage of the capacitor C1 where "t" indicates time.

Similarly to the first transistor Q1, the source of the second transistor Q2 is connected to the terminal DCin. The drain of the second transistor Q2 is connected to the capacitor Csub (i.e., connected to the second rectifying-and-smoothing circuit 302). The gate of the second transistor Q2 is connected together with the first transistor Q1 to the capacitor C1.

Figure 7:
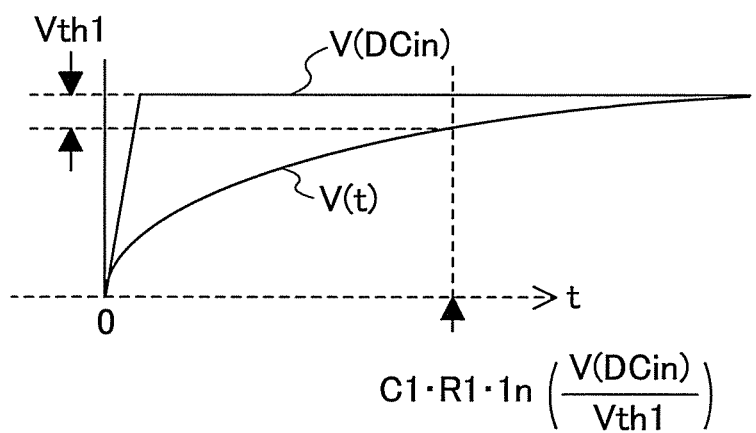
FIG. 7 is a drawing used to describe operations of a control voltage generating circuit illustrated in FIG. 6.

FIG. 7 is a drawing used to describe operations of the control voltage generating circuit of FIG. 6. FIG. 7 shows changes in the voltage V(t) and a voltage V(DCin) applied to the terminal DCin with respect to time elapsed after the main power switch 12 is turned on.

Immediately before the main power switch 12 is turned on to start the switching power supply device 200, the capacitor C1 has not been charged. When t=0 indicates the time when the main power switch 12 is turned on, the voltage V(t) of the capacitor C1 is represented by V(0)=0.

Immediately after the switching power supply device 200 is started, gate-source voltages of the first transistor Q1 and the second transistor Q2 become greater than a threshold voltage Vth1 (or threshold voltages Vth1 and Vth2), and the first transistor Q1 and the second transistor Q2 are turned on. As a result, the current supplied from the direct-current power supply via the resistor R1 starts charging the capacitor C1 started (charging of the capacitor Csub is also started).

When C1 indicates the capacitance of the capacitor C1, the voltage V(t) of the capacitor C1 is represented by a formula (1) below.

$$V(t) = V(DCin) \cdot (1 - e^{-\frac{t}{R1 \cdot C1}}) \quad (1)$$

As the capacitor C1 is charged and the voltage V(t) increases according to the formula (1), the gate-source voltage of the first transistor Q1 decreases. The gate-source voltage is represented by "V(DCin)−V(t)". When the gate-source voltage becomes less than or equal to the threshold voltage Vth1 of the first transistor Q1, the first transistor Q1 is turned off. In other words, when the voltage V(t) of the capacitor C1 increases to a level that satisfies (V(DCin)−V(t))≤Vth1, the first transistor Q1 is turned off.

Similarly, when the gate-source voltage becomes less than or equal to the threshold voltage Vth2 of the second transistor Q2, the second transistor Q2 is turned off. In other words, when the voltage V(t) of the capacitor C1 increases to a level that satisfies (V(DCin)−V(t))≤Vth2, the second transistor Q2 is turned off. In some cases, the threshold voltages Vth1 and Vth2 may be different from each other. However, in the descriptions below, it is assumed that the first transistor Q1 and the second transistor Q2 are turned off at substantially the same time and the threshold voltage Vth1 and the threshold voltage Vth2 are the same (for this reason, only the threshold voltage Vth1 is used in the descriptions below). The gate of the second transistor Q2 and a connecting line L1 connecting the gate and the capacitor C1 constitute a turn-off unit.

Time toff from when the switching power supply device 200 is started to when the first transistor Q1 and the second transistor Q2 are turned off is represented by a formula (2) below.

$$t_{OFF} = C1 \cdot R1 \cdot \ln\left(\frac{V(DCin)}{Vth1}\right) \quad (2)$$

The relationship between the time toff and charging of the capacitor Csub is described below. Like the first transistor Q1, the gate of the second transistor Q2 is connected to the capacitor Therefore, the second transistor Q2 is turned on when the switching power supply device 200 is started (t=0). As a result, the capacitor Csub of the second rectifying-and-smoothing circuit 302 is charged by a current supplied from the direct-current power supply.

When the capacitor Csub is charged and its voltage reaches a driving voltage of the control circuit 101, the control circuit 101 starts switching control to turn the power MOSFET Qsw on and off.

When the power MOSFET Qsw is turned on and off, the value of the current flowing through the primary coil Lp changes, and currents start to flow through the secondary coil Ls and the tertiary coil Lsub. The current flowing through the secondary coil Ls charges the capacitor Cs of the first rectifying-and-smoothing circuit 301, and generates a voltage (output voltage) at the terminal DCout.

The current flowing through the tertiary coil Lsub charges the capacitor Csub of the second rectifying-and-smoothing circuit 302 and is supplied to the terminal VCC of the control circuit 101. Hereafter, a voltage for driving the control circuit 101 may be called a driving voltage VCC.

With the configuration as described above, power for generating the driving voltage VCC for driving the control circuit 101 is supplied from the starting circuit 400 and the second rectifying-and-smoothing circuit 302. Accordingly, when the second rectifying-and-smoothing circuit 302 starts supplying power, supply of power from the starting circuit 400 becomes unnecessary. For this reason, the time toff represented by formula (2) is adjusted such that the first transistor Q1 and the second transistor Q2 are turned off after the second rectifying-and-smoothing circuit 302 starts supplying the driving power VCC: Time toff>Time necessary for the voltage of the capacitor Csub to reach the driving voltage VCC.

Effects of this embodiment are described below. Turning off the second transistor Q2 makes it possible to provide high impedance between the direct voltage applied to the terminal DCin and the driving voltage VCC and thereby makes it possible to reduce the power consumption by the starting resistor Rstart. It is not necessary to turn off the first transistor Q1 and the second transistor Q2 at the same time as long as the second transistor Q2 is turned off after the time toff from when the switching power supply device 200 is started.

Still, the first transistor Q1 and the second transistor Q2 may be turned off at the same time. This configuration makes it possible to configure the first transistor Q1 and the second transistor Q2 to have the same electrical characteristics so that one connecting line L1 can be used. This in turn makes it possible to reduce the costs. Also, turning off both the first transistor Q1 and the second transistor Q2 makes it possible to minimize the power loss. Further, the first transistor Q1 may be turned off after the second transistor Q2 is turned off.

Since the breaking current between the drain and the source of the second transistor Q2 is from several µA to ten several µA, the above configuration makes it possible to reduce the power loss to about one thousandth of the power loss caused by the starting resistor Rstart.

The time toff represented by the formula (2), i.e., the time from when the switching power supply device 200 is started to when the first transistor Q1 and the second transistor Q2 are turned off (time necessary to charge the capacitor C1 by the starting circuit 400), can be freely changed by adjusting the resistance of the resistor R1, the capacitance of the capacitor C1, and the first transistor Q1. Also the time toff can be changed by adjusting the threshold voltage Vth1 for the gate-source voltages of the first transistor Q1 and the second transistor Q2.

For example, since the current for charging the capacitor Csub can be directly supplied through the second transistor Q2 (without going through the resistor R1 and the capacitor C1), increasing the resistance of the resistor R1 makes it possible to more efficiently charge the capacitor Csub and thereby to reduce the influence of the starting circuit 400 on the start-up time. In other words, increasing the resistance of the resistor R1 makes it possible to reduce the power consumption of the starting circuit 400 without increasing the start-up time.

Figure 8:
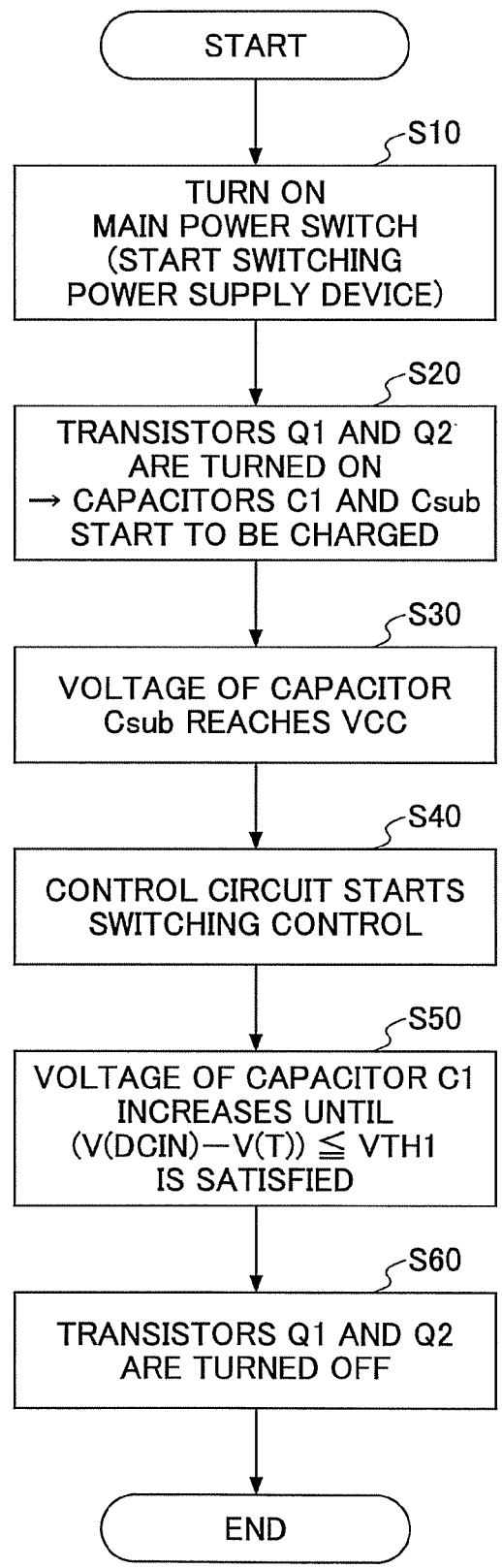
FIG. 8 is a flowchart for describing a start-up process of a switching power supply device.

FIG. 8 is a flowchart for describing a start-up process of the switching power supply device 200 of this embodiment.

First, the main power switch 12 is turned on (S10) to start the switching power supply device 200.

When the main power switch 12 is turned on, a voltage from the direct-current power supply is applied to the sources of the first transistor Q1 and the second transistor Q2. As a result, the gate-source voltages of the first transistor Q1 and the second transistor Q2 become greater than the threshold voltage Vth1, the first transistor Q1 and the second transistor Q2 are turned on, and the capacitors C1 and Csub start to be charged (S20).

Next, the voltage of the capacitor Csub reaches the driving voltage VCC (S30). The time necessary for the voltage of the capacitor Csub to reach the driving voltage VCC is less than the time necessary for the voltage of the capacitor C1 to reach a level that satisfies $(V(DCin)-V(t)) \leq Vth1$.

When the voltage of the capacitor Csub reaches the driving voltage VCC, the control circuit 101 starts switching control to turn the power MOSFET Qsw on and off (S40). When the power MOSFET Qsw is turned on and off, the capacitor Cs of the first rectifying-and-smoothing circuit 301 is charged.

After the control circuit 101 starts the switching control, the voltage of the capacitor C1 increases until $(V(DCin)-V(t)) \leq Vth1$ is satisfied (S50). As a result, the first transistor Q1 and the second transistor Q2 are turned off (S60). Thereafter, no current flows through the starting circuit 400 including the resistor R1 and the power consumption is reduced.

Thus, the switching power supply device 200 of this embodiment makes it possible to reduce the power consumption of the starting circuit 400 without increasing the start-up time.

<Second Embodiment>

Figure 9:
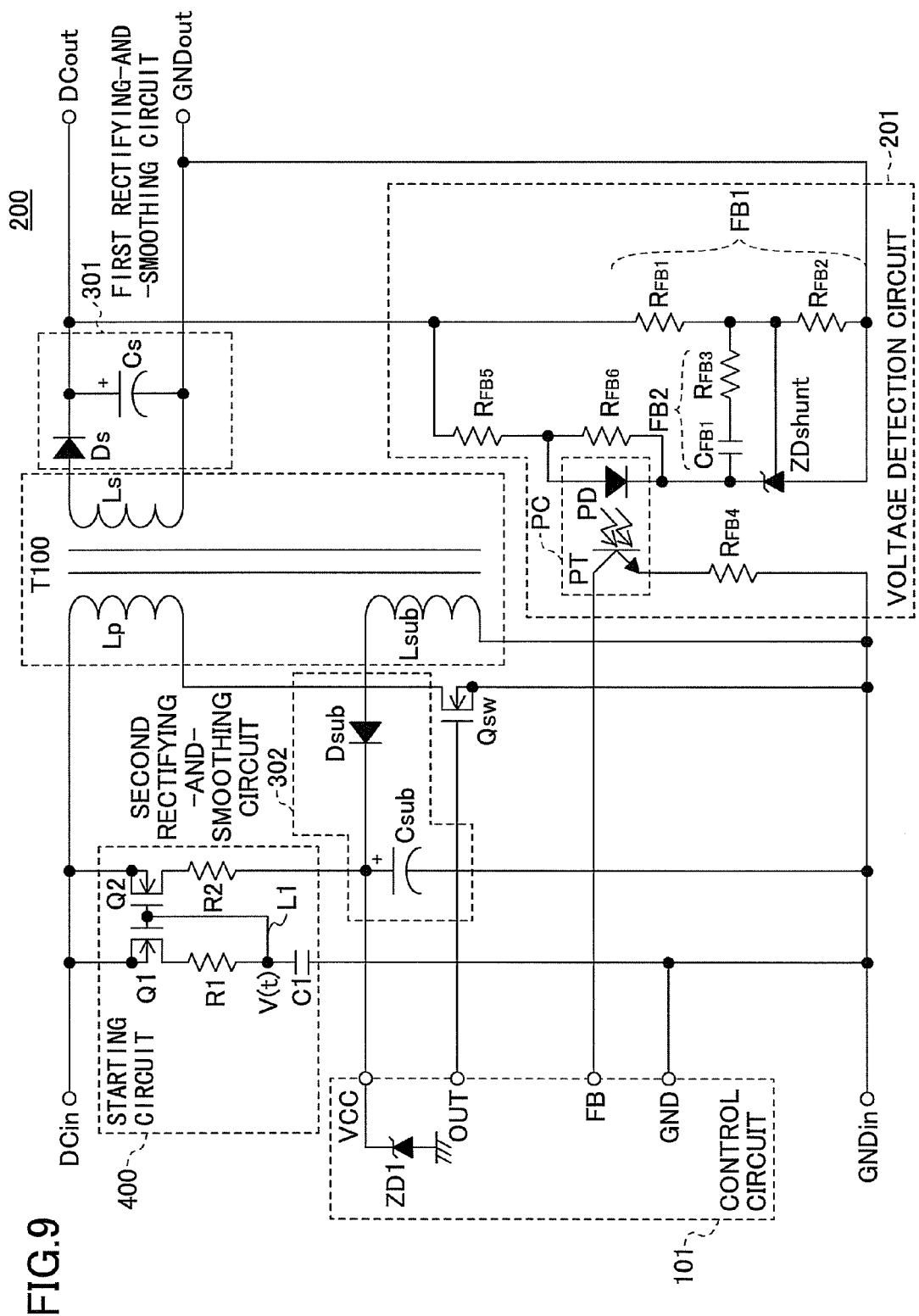
FIG. 9 is a circuit diagram illustrating an exemplary configuration of a switching power supply device according to a second embodiment of the present invention.

FIG. 9 is a circuit diagram illustrating an exemplary configuration of the switching power supply device 200 according to a second embodiment of the present invention. In FIG. 9, the same reference numbers are used for components corresponding to those shown in FIG. 6, and descriptions of those components are omitted.

The configuration of the starting circuit 400 of FIG. 9 is different from that of FIG. 6 in that a resistor R2 is provided between the second transistor Q2 and the capacitor Csub.

The second transistor Q2 and the resistor R2 are connected in series to the capacitor Csub. With this configuration, similarly to the voltage V(t) that increases according to the formula (1), the terminal voltage of the capacitor Csub increases gradually.

In other words, providing the resistor R2 between the second transistor Q2 and the capacitor Csub makes it possible to prevent an inrush current from flowing from the direct-current power supply to the capacitor Csub and the terminal VCC of the control circuit 101. This configuration also makes it possible to regulate the current supplied via the second transistor Q2 to the control circuit 101.

Operations of the switching power supply device 200 of the second embodiment are substantially the same as those of the first embodiment. Immediately after the switching power supply device 200 is started, the first transistor Q1 and the second transistor Q2 are turned on. The direct-current power supply charges the capacitors C1 and Csub and supplies the driving voltage to the control circuit 101 via the starting circuit 400 until the time toff passes. After the control circuit 101 starts switching control of the power MOSFET Qsw, the voltage of the capacitor C1 increases and the first transistor Q1 and the second transistor Q2 are turned off. Accordingly, after the control circuit 101 starts switching control of the power MOSFET Qsw, the power consumption related to the starting current is reduced to a minimum level.

The resistance of the resistor R2 may be set at a minimum value that is necessary to prevent the inrush current. If the time necessary for the voltage of the capacitor Csub to reach the driving voltage VCC of the control circuit 101 becomes longer than the time toff as a result of providing the resistor R2 before the capacitor Csub, the resistance of the resistor R1 and the capacitance of the capacitor C1 may be adjusted. Therefore, even with the configuration of the second embodiment including the resistor R2, it is possible to achieve substantially the same start-up time as in the first embodiment. Also, it is easy to configure the starting circuit 400 such that the first transistor Q1 and the second transistor Q2 are not turned off until the voltage of the capacitor Csub reaches the driving voltage VCC.

<Third Embodiment>

Figure 10:
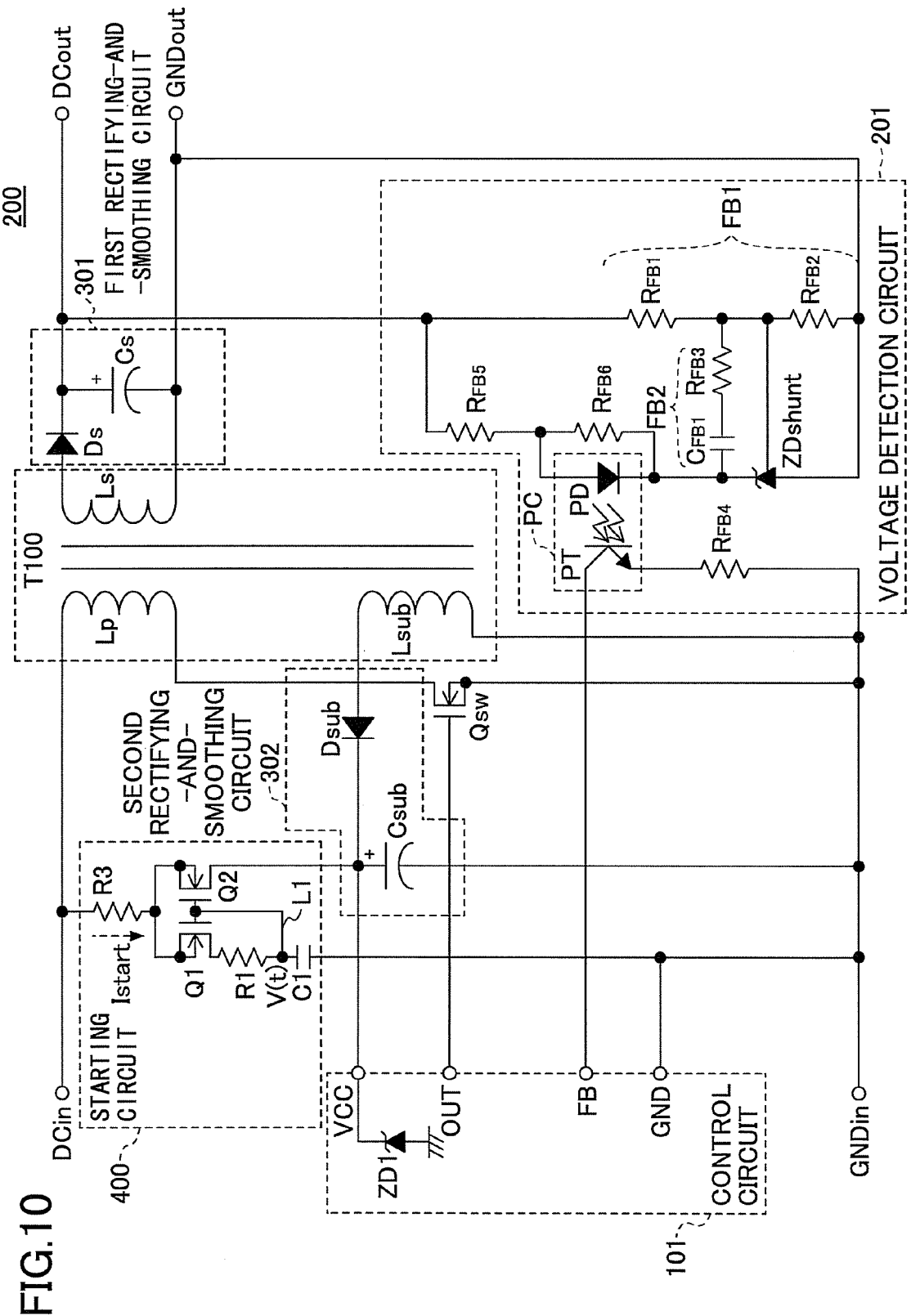
FIG. 10 is a circuit diagram illustrating an exemplary configuration of a switching power supply device according to a third embodiment of the present invention.

FIG. 10 is a circuit diagram illustrating an exemplary configuration of the switching power supply device 200 according to a third embodiment of the present invention. In FIG. 10, the same reference numbers are used for components corresponding to those shown in FIG. 6, and descriptions of those components are omitted.

The configuration of the starting circuit 400 of FIG. 10 is different from that of FIG. 6 in that a resistor R3 is connected in series between the terminal DCin to which power is supplied from the direct-current power supply and the first and second transistors Q1 and Q2.

With the configurations of the first embodiment (FIG. 6) and the second embodiment (FIG. 9), a direct voltage is supplied from the direct-current power supply to the first transistor Q1 and the second transistor Q2 when the switching power supply device 200 is started. With these configurations, the first transistor Q1 and the second transistor Q2 are directly connected to the direct-current power supply and therefore a comparatively high voltage is applied to the first transistor Q1 and the second transistor Q2 immediately after the switching power supply device 200 is started. More specifically, since the capacitor C1 has not been charged yet immediately after the switching power supply device 200 is started, a drain-source voltage and a gate-source voltage of one hundred and several tens volts to about 400 volts are applied to the first transistor Q1 and the second transistor Q2.

Such a high voltage may exceed the absolute maximum ratings for the drain-source voltage and the gate-source voltage and may damage the first transistor Q1 and the second transistor Q2. Although transistors with high absolute maximum ratings may be used as the first transistor Q1 and the second transistor Q2, using such transistors may increase the size and costs of the starting circuit 400.

For these reasons, in the third embodiment, the resistor R3 is provided between the terminal DCin and the first and second transistors Q1 and Q2. With this configuration, a voltage drop is caused by a current Istart for charging the capacitors C1 and Csub and the resistor R and as a result, the drain-source voltage and the gate-source voltage decrease. That is, even when the voltage of the capacitor C1 is zero immediately after the switching power supply device 200, the drain-source and gate-source voltages of the first and second transistors Q1 and Q2, drop by "resistance of the resistor R3×Istart". Thus, it is possible to limit the drain-source and gate-source voltages within the absolute maximum ratings by appropriately determining the resistance of the resistor R3.

This in turn makes it possible to use resistors with relatively low absolute maximum ratings for the drain-source and gate-source voltages as the first transistor Q1 and the second transistor Q2 and thereby makes it possible to reduce the size and costs of the starting circuit 400.

Since the configuration of the starting circuit 400 of the third embodiment is substantially the same as that of the first embodiment except that the resistor R3 is connected in series to each of the capacitor C1 and the capacitor Csub, it is possible to keep the time necessary for the voltage of the capacitor Csub to reach the driving voltage VCC within the time toff. Thus, even when the resistor R3 is added, it is not necessary to adjust the resistance of the resistor R1 and the capacitance of the capacitor C1.

Operations of the switching power supply device 200 of the third embodiment are substantially the same as those of the first embodiment. Immediately after the switching power supply device 200 is started, the first transistor Q1 and the second transistor Q2 are turned on. The direct-current power supply charges the capacitors C1 and Csub and supplies the driving voltage to the control circuit 101 via the starting circuit 400 until the time toff passes. After the control circuit 101 starts switching control of the power MOSFET Qsw, the voltage of the capacitor C1 increases and the first transistor Q1 and the second transistor Q2 are turned off. Accordingly, after the control circuit 101 starts switching control of the power MOSFET Qsw, the power consumption related to the starting current is reduced to a minimum level.

Figure 11:
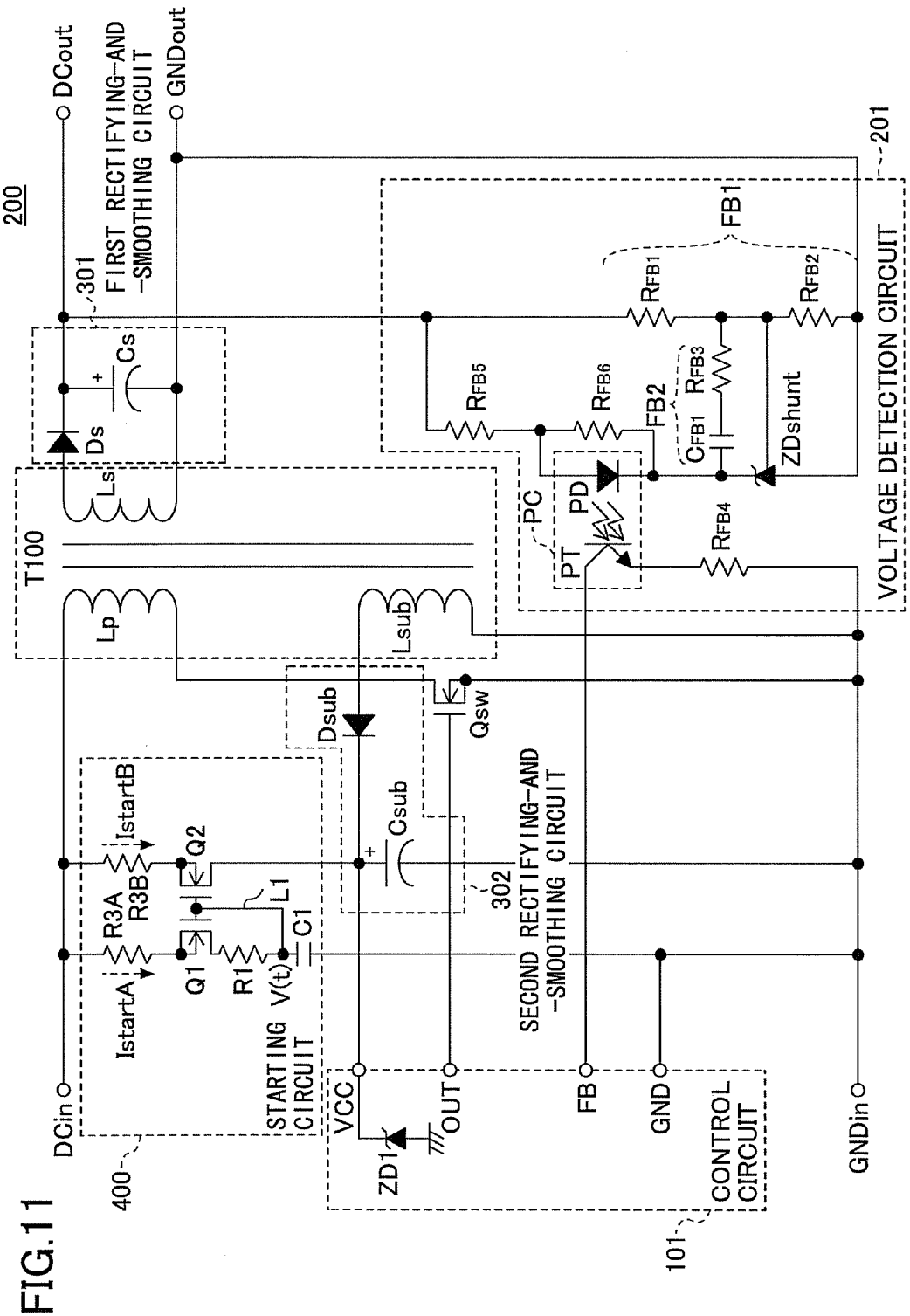
FIG. 11 is a circuit diagram illustrating a variation of the switching power supply device of FIG. 10.

FIG. 11 is a circuit diagram illustrating a variation of the switching power supply device 200 of FIG. 10. In FIG. 11, instead of the resistor R3 of FIG. 10, a resistor R3A is connected in series between the terminal DCin and the first transistor Q1, and a resistor R3B is connected in series between the terminal DCin and the second transistor Q2.

Similarly to the configuration of FIG. 10, since the drain-source and gate-source voltages of the first transistor Q1 drop by "resistance of the resistor R3A×IstartA", it is possible to limit the drain-source and gate-source voltages within the absolute maximum ratings of the first transistor Q1 by appropriately determining the resistance of the resistor R3A. Also, since the drain-source and gate-source voltages of the second transistor Q2 drop by "resistance of the resistor R3B× IstartB", it is possible to limit the drain-source and gate-source voltages within the absolute maximum ratings of the second transistor Q2 by appropriately determining the resistance of the resistor R3B.

The resistance of the resistors R3A and R38 may be set at any values as long as the time necessary for the voltage of the capacitor Csub to reach the driving voltage VCC does not become greater than or equal to the time toff. For example, the resistance of the resistor R3B may be set at a minimum value that is necessary to prevent an inrush current to the terminal VCC and that does not increase the start-up time.

<Fourth Embodiment>

Figure 12:
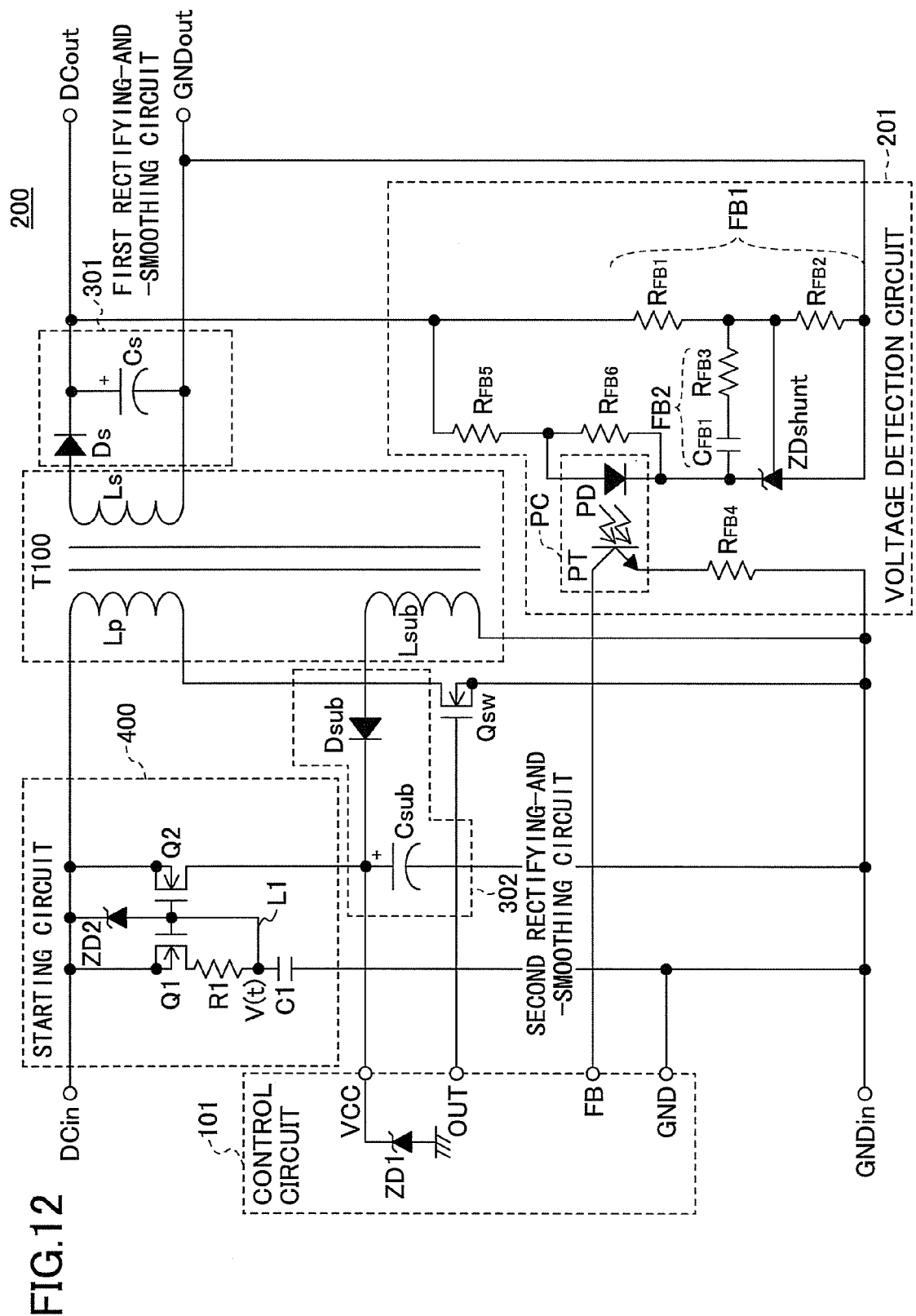
FIG. 12 is a circuit diagram illustrating an exemplary configuration of a switching power supply device according to a fourth embodiment of the present invention.

FIG. 12 is a circuit diagram illustrating an exemplary configuration of the switching power supply device 200 according to a fourth embodiment of the present invention. In FIG. 12, the same reference numbers are used for components corresponding to those shown in FIG. 6, and descriptions of those components are omitted.

The configuration of the starting circuit 400 of FIG. 12 is different from that of FIG. 6 in that a common Zener diode ZD2 (voltage-regulator diode) is provided between the terminal DCin to which power is supplied from the direct-current power supply and the gates of the first and second transistors Q1 and Q2.

As described in the third embodiment, since the capacitor C1 has not been charged yet immediately after the switching power supply device 200 is started, a drain-source voltage and a gate-source voltage of one hundred and several tens volts to about 400 volts are applied to the first transistor Q1 and the second transistor Q2. Such a high voltage may overload the first transistor Q1 and the second transistor Q2.

For this reason, in this embodiment, the Zener diode ZD2 is provided to buffer the voltage supplied from the direct-current power supply. As is well known, a Zener diode allows a current to flow even in the reverse direction when a reverse voltage greater than a rated breakdown voltage is applied.

The breakdown voltage of the Zener diode ZD2 is set at a value that is smaller than the direct voltage applied between the gate and the source of the first transistor Q1 and between the gate and the source of the second transistor Q2 immediately after the switching power supply device 200 is started. With this configuration, a current flows through the Zener diode ZD2 immediately after the switching power supply device 200 is started. Accordingly, this configuration makes it possible to decrease the direct voltage applied between the gate and the source of the first transistor Q1 and between the gate and the source of the second transistor Q2. In other words, providing the Zener diode ZD2 makes it possible to limit the gate-source voltages of the first and second transistors Q1 and Q2 within the absolute maximum ratings.

This configuration also makes it possible to use resistors with relatively low absolute maximum ratings for the drain-source and gate-source voltages as the first transistor Q1 and the second transistor Q2 and thereby makes it possible to reduce the size and costs of the starting circuit 400.

Operations of the image forming apparatus 200 of this embodiment are described below. Immediately after the switching power supply device 200 is started, the first transistor Q1 and the second transistor Q2 are turned on. Also, the Zener diode ZD2 breaks down and a current flows also from the Zener diode ZD2 to the capacitor C1. The direct-current power supply charges the capacitors C1 and Csub and supplies the driving voltage to the control circuit 101 via the starting circuit 400 until the time toff passes. After the control circuit 101 starts switching control of the power MOSFET Qsw, the voltage of the capacitor C1 increases and the first transistor Q1 and the second transistor Q2 are turned off. Accordingly, after the control circuit 101 starts switching control of the power MOSFET Qsw, the power consumption related to the starting current is reduced to a minimum level.

Also with the configuration of the fourth embodiment, the capacitor C1 discharges electricity via the Zener diode ZD2 to the terminal DCin when the switching power supply device 200 is stopped (turned off) and the voltage from the direct-current power supply (the voltage at the terminal DCin) becomes zero. Thus, this configuration makes it possible to improve the safety of the switching power supply device 200 after it is turned off.

<Fifth Embodiment>

In the first through fourth embodiments, the starting circuit 400 is provided separately from the control circuit 101. However, since the starting circuit 400 is implemented by components such as a transistor(s), a resistor(s), a capacitor(s), and a diode(s), the starting circuit 400 may be integrated with the control circuit 101 by forming the components on the same silicon substrate as that of the control circuit 101.

Figure 13:
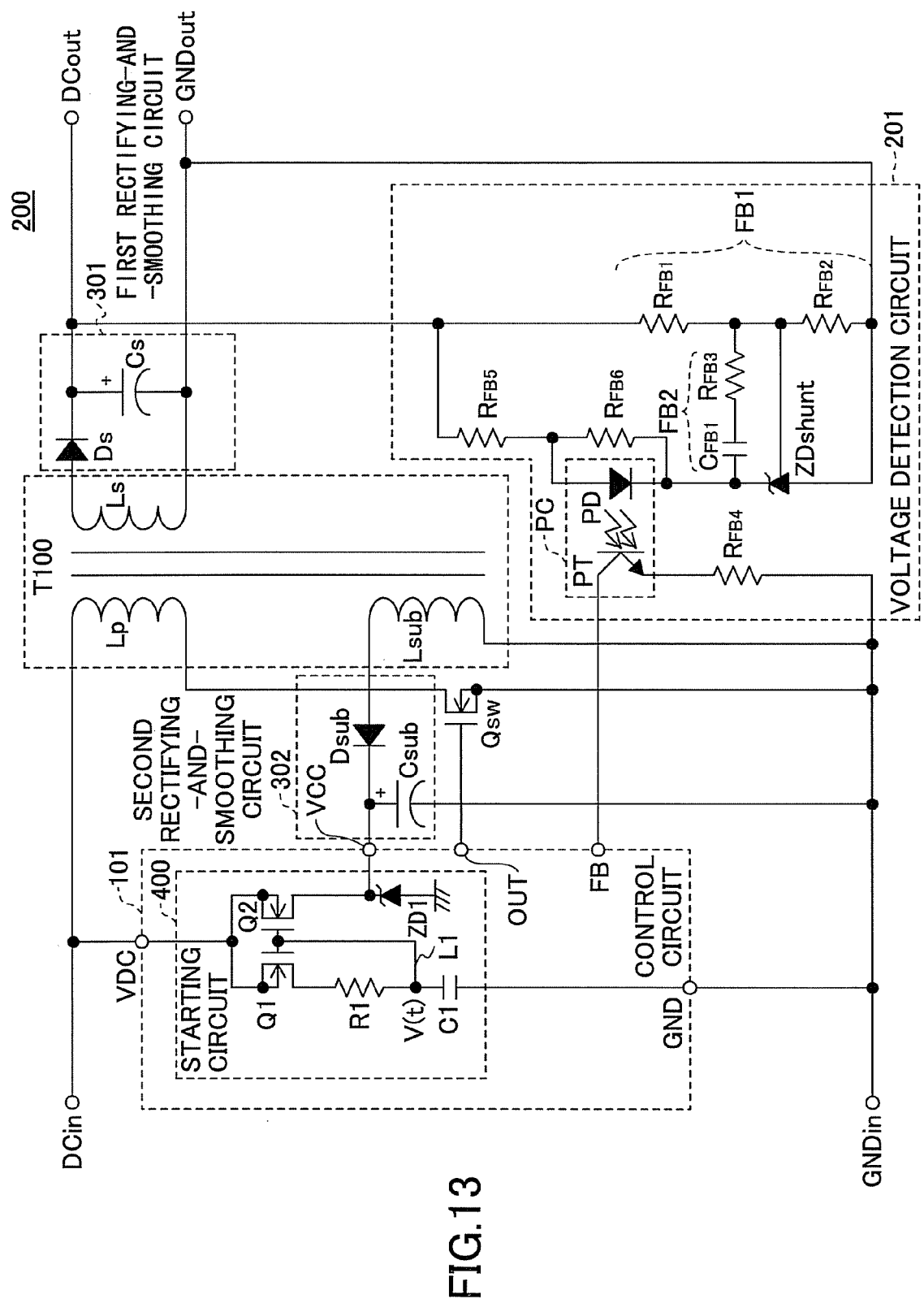
FIG. 13 is a circuit diagram illustrating a switching power supply device where a starting circuit of the first embodiment (FIG. 6) is integrated with a control circuit.
Figure 14:
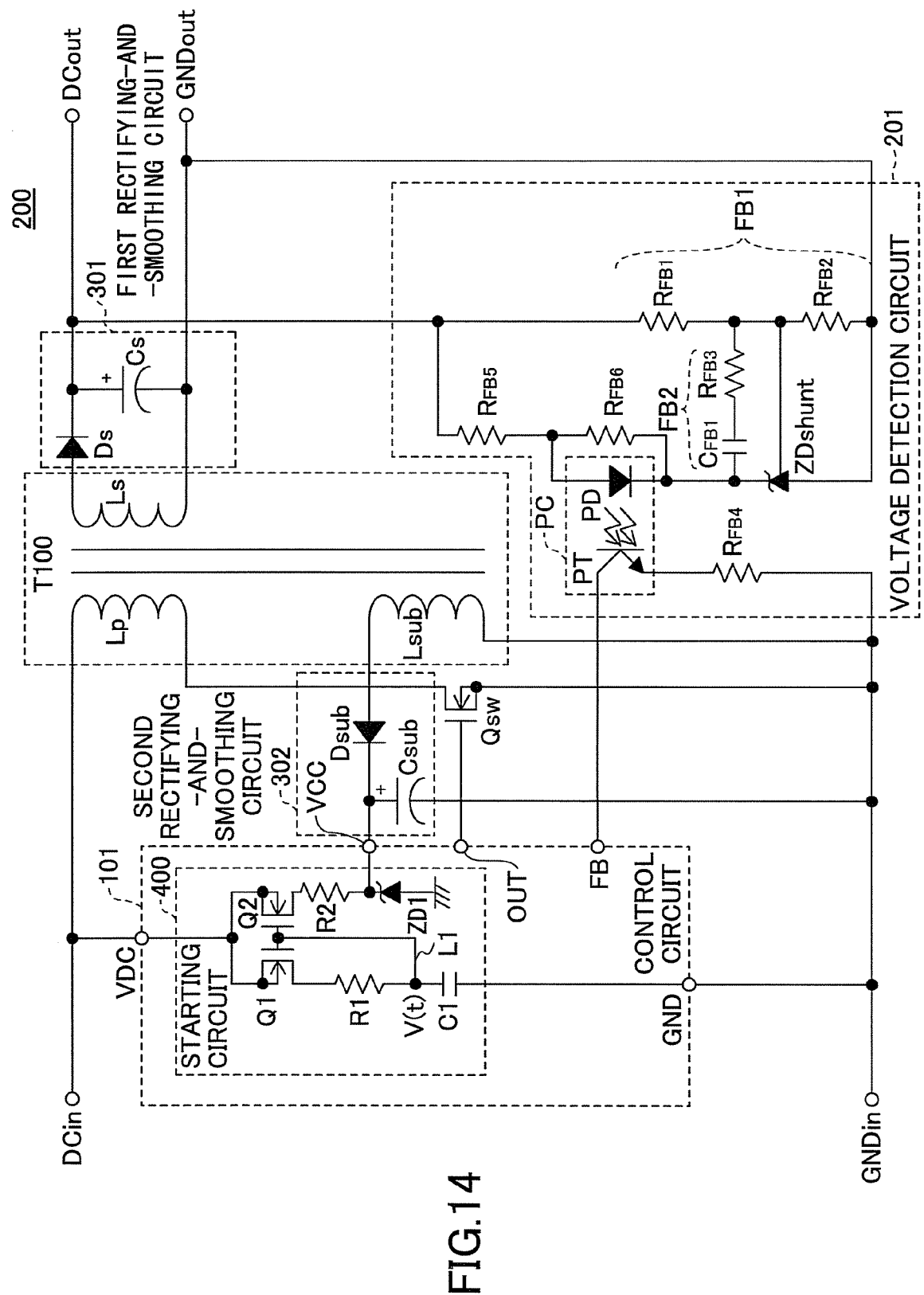
FIG. 14 is a circuit diagram illustrating a switching power supply device where a starting circuit of the second embodiment (FIG. 9) is integrated with a control circuit.
Figure 15:
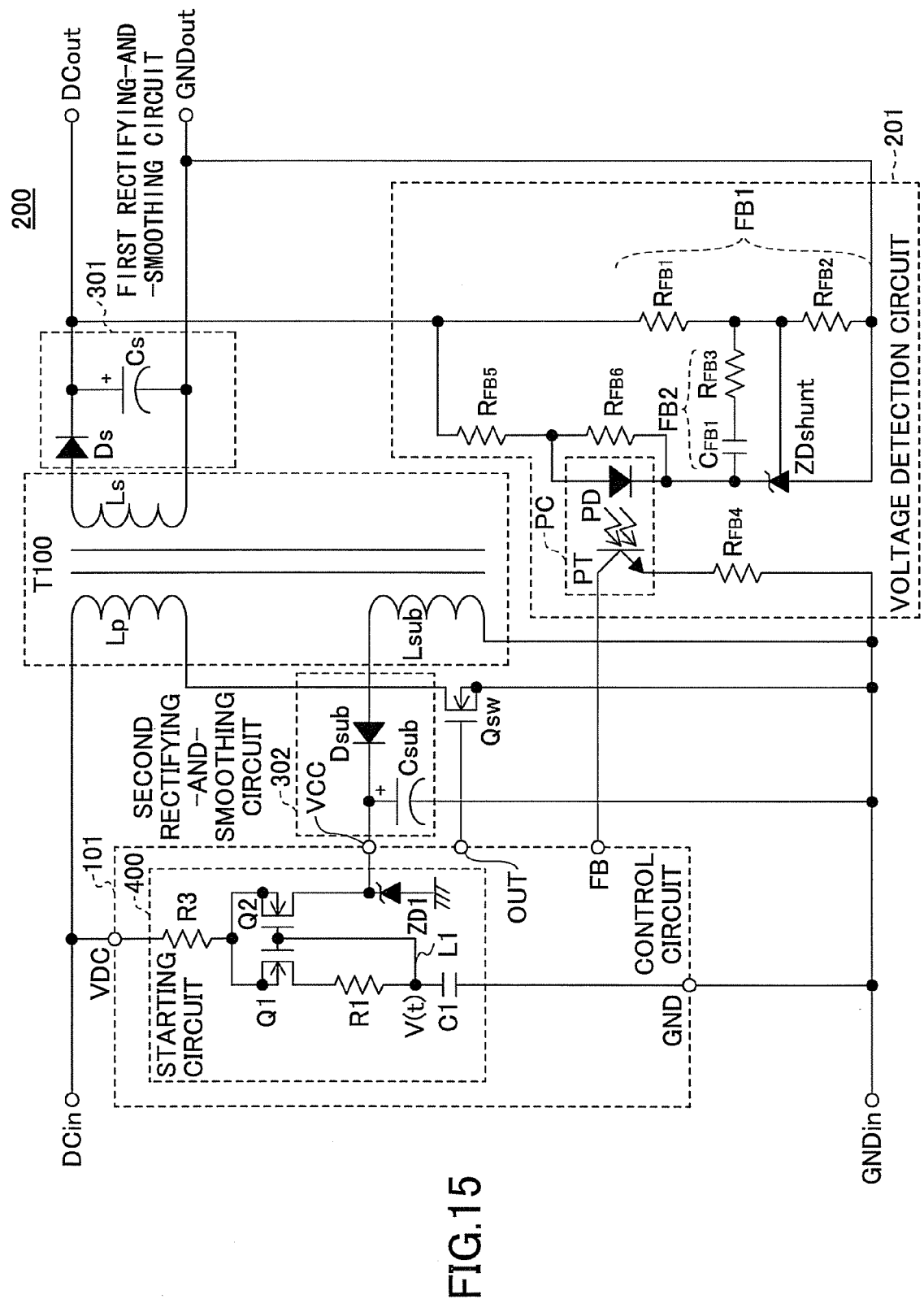
FIG. 15 is a circuit diagram illustrating a switching power supply device where a starting circuit of the third embodiment (FIG. 10) is integrated with a control circuit.
Figure 16:
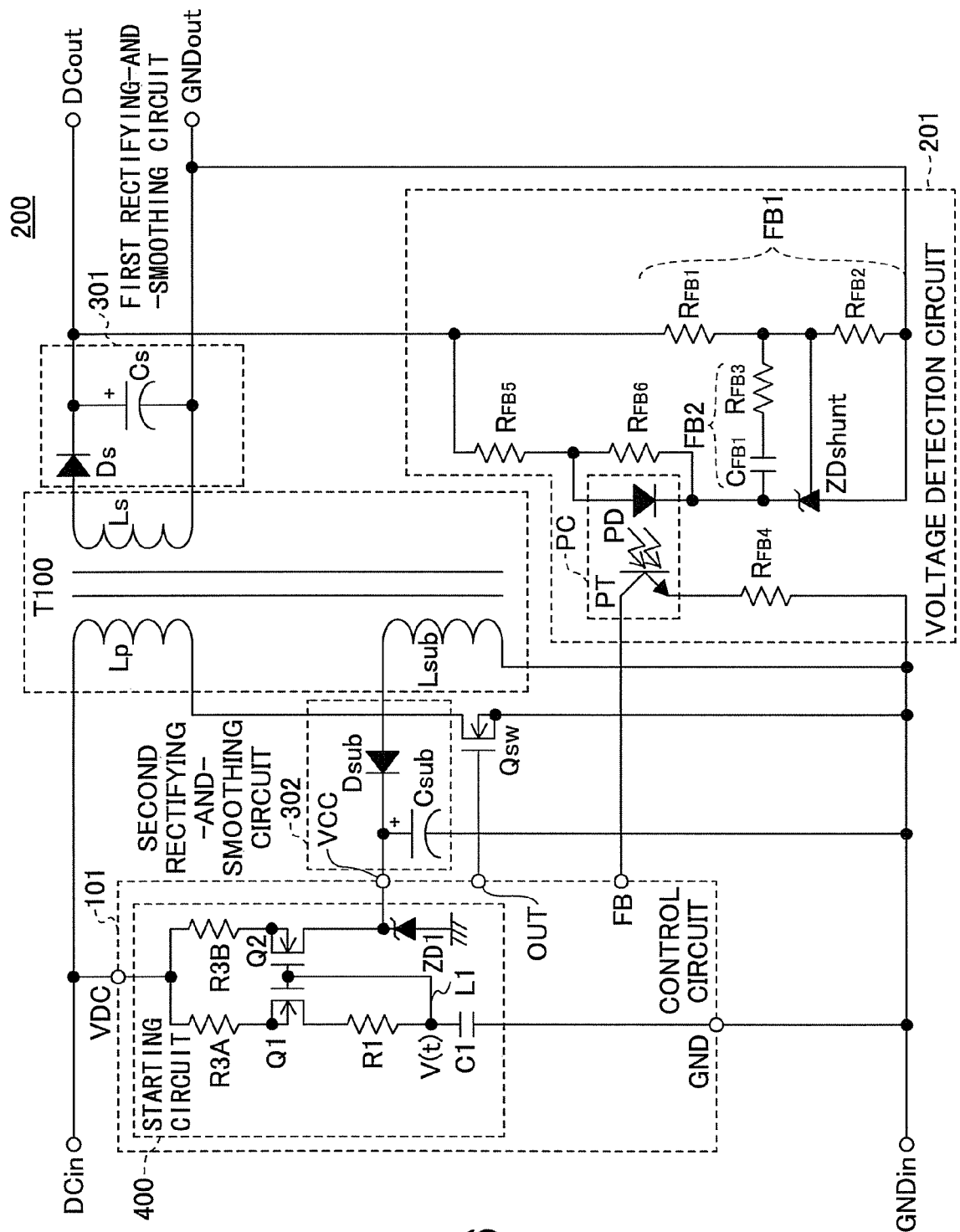
FIG. 16 is a circuit diagram illustrating a switching power supply device where a starting circuit of the third embodiment (FIG. 11) is integrated with a control circuit.
Figure 17:
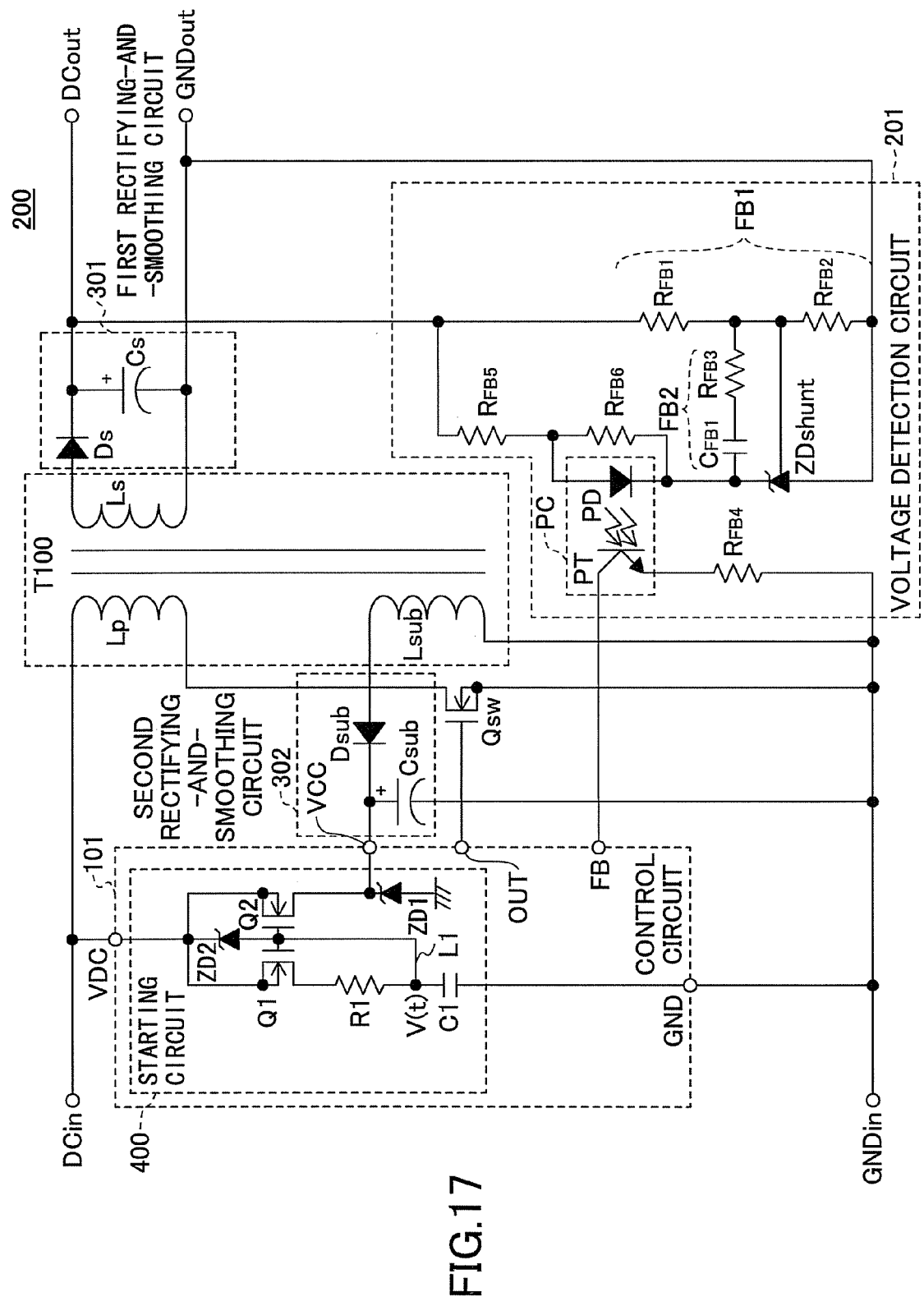
FIG. 17 is a circuit diagram illustrating a switching power supply device where a starting circuit of the fourth embodiment (FIG. 12) is integrated with a control circuit.

FIG. 13 is a circuit diagram illustrating an exemplary configuration of the switching power supply device 200 where the starting circuit 400 of the first embodiment (FIG. 6) is integrated with the control circuit 101. Similarly, FIG. 14 is an example where the starting circuit 400 of the second embodiment (FIG. 9) is integrated with the control circuit 101, FIGS. 15 and 16 are examples where the starting circuit 400 of the third embodiment (FIG. 10 or 11) is integrated with the control circuit 101, and FIG. 14 is an example where the starting circuit 400 of the fourth embodiment (FIG. 12) is integrated with the control circuit 101.

As is apparent from FIGS. 13 through 17, there is no change to the first rectifying-and-smoothing circuit 301, the second rectifying-and-smoothing circuit 302, and the voltage detection circuit 201 even when the starting circuit 400 is integrated with the control circuit 101. Thus, the configurations of FIGS. 13 through 17 only make it necessary to add one terminal VDC for supplying power from the direct-current power supply, and adding the terminal VDC does not incur significant costs.

Accordingly, the configurations of FIGS. 13 through 17 make it possible to reduce the number of components of the switching power supply device 200 and thereby make it easier to design the switching power supply device 200.

As described above, an aspect of the present invention provides a switching power supply device and an image forming apparatus including the switching power supply device and makes it possible to reduce the power loss caused by a starting resister while the load of the switching power supply device is low (e.g., while the switching power supply device is a stable/standby state).

The present invention is not limited to the specifically disclosed embodiments, and variations and modifications may be made without departing from the scope of the present invention.

What is claimed is:

1. A power supply device, comprising:
a transformer including a primary coil, a secondary coil, and a tertiary coil;
a switching element connected via the primary coil to a direct-current power supply;
a first rectifying-and-smoothing circuit rectifying and smoothing a voltage generated in the secondary coil and supplying the rectified and smoothed voltage to a load;
a control circuit turning on and off the switching element;
a second rectifying-and-smoothing circuit rectifying and smoothing a voltage generated in the third coil and thereby generating a driving voltage for driving the control circuit; and
a starting circuit including
a first transistor, a first resistor, and a first capacitor connected in series between the direct-current power supply and a ground,
a second transistor connected between the direct-current power supply and the second rectifying-and-smoothing circuit, and
a turn-off unit turning off at least the second transistor out of the first transistor and the second transistor when the first capacitor is charged to a predetermined voltage,
wherein the second rectifying-and-smoothing circuit includes a second capacitor for supplying the driving voltage to the control circuit; and
time for charging the first capacitor to the predetermined voltage is greater than time for charging the second capacitor to the driving voltage.

2. The power supply device as claimed in claim 1, wherein time for which the first transistor and the second transistor are turned on is determined by a resistance of the first resistor and a capacitance of the first capacitor.

3. The power supply device as claimed in claim 1, wherein the starting circuit further includes a second resistor connected between the second transistor and the second rectifying-and-smoothing circuit and regulating a voltage level to be applied to the control circuit.

4. The power supply device as claimed in claim 3, wherein the starting circuit is integrated with the control circuit.

5. The power supply device as claimed in claim 1, wherein the starting circuit further includes a third resistor connected between the direct-current power supply and the first and second transistors.

6. The power supply device as claimed in claim 5, wherein the starting circuit is integrated with the control circuit.

7. The power supply device as claimed in claim 1, wherein the starting circuit further includes a third resistor connected between the direct-current power supply and the first transistor and a fourth resistor connected between the direct-current power supply and the second transistor.

8. The power supply device as claimed in claim 7, wherein the starting circuit is integrated with the control circuit.

9. The power supply device as claimed in claim 1, wherein the starting circuit further includes a voltage-regulator diode provided between the direct-current power supply and the first capacitor and connected to gates of the first transistor and the second transistor.

10. The power supply device as claimed in claim 9, wherein the starting circuit is integrated with the control circuit.

11. The power supply device as claimed in claim 1, wherein the starting circuit is integrated with the control circuit.

12. An image forming apparatus comprising the power supply device of claim 1.

* * * * *